United States Patent Office 3,551,529
Patented Dec. 29, 1970

3,551,529
DI-LOWER ALKYL PHOSPHITES OF 2-(LOWER-ALKYLTHIO)ALKANALDOXIMES
Girts Kaugars, Cooper Township, Kalamazoo County, Mich., assignor to The Upjohn Company, Kalamazoo, Mich., a corporation of Delaware
No Drawing. Filed Nov. 9, 1967, Ser. No. 681,888
Int. Cl. A01n 9/36; C07f 9/08
U.S. Cl. 260—944     5 Claims

ABSTRACT OF THE DISCLOSURE

Certain new di-lower-alkylphosphates of 2-(lower-alkylthio)alkanaldoximes are acetylcholinesterase inhibitors and are active against invertebrate animal pests such as insects and mites. The 2-(lower-alkylthio) group can be sulfide, sulfinyl, or sulfonyl, and a thiophosphate embodiment is described. Activity against cotton boll weevil, the two-spotted spider mite, and other arthropod pests is demonstrated, and various compositions and methods of use are described.

SUMMARY OF THE INVENTION

This invention pertains to new organic chemical compounds and a process for preparing the same. The invention is more particularly directed to new dilower-alkylphosphates of 2-(lower - alkylthio)alkanaldoximes and a process for preparing the same. The new 2-(lower-alkylthioalkanaldoxime dilower-alkylphosphates have the structural formula:

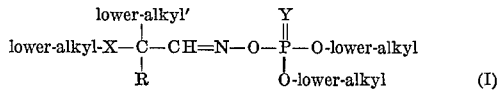

wherein X is a sulfur group selected from the group consisting of —S—,

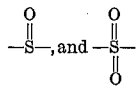

Y is oxygen or sulfur; lower-alkyl is of from 1 to 4 carbon atoms, inclusive; R is hydrogen or lower-alkyl of from 1 to 3 carbon atoms, inclusive; and the total number of lower-alkyl carbon atoms comprising R and lower-alkyl is not more than 8.

DETAILED DESCRIPTION OF THE INVENTION

The new 2-(lower-alkylthio)alkanaldoxime di-lower-alkyl-phosphates of Formula I are pharmacologically active as inhibitors of acetylcholinesterase. Illustratively, a $2.6 \times 10^{-8}$ molar concentration of the new compound 2-methyl-2 - (methylthio)propionaldoxime diethylphosphate significantly inhibited (50% inhibition) the acetylcholinesterase in a standarized test using a housefly head homogenate as source of the enzyme and acetylcholine bromide as substrate.

The new compounds are effective pesticides and can be used to control invertebrate pests. More particularly, the compounds have been found to be active against invertebrate animals of the Phylum Arthropoda, illustratively Class Insecta, for example, order Colyeoptera, more specifically, the cotton boll weevil (*Anthonomus grandis* Boheman), the confused flour beetle (*Tribolium confusum* Jacquelin de Val), and the Mexican bean beetle (*Epilachna varivestis* Mulsant), order Diptera, more specifically, the housefly (*Musca domestica* Linnaeus), order Orthoptera, more specifically, the house cricket (*Acheta domesticus* Linnaeus), and the German cockroach (*Blatella germanica* Linnaeus), and order Lepidoptera, more specifically, the Southern armyworm (*Prodenia eridania* Cramer), and Class Arachnida, for example, order Acarina, more specifically, the two-spotted spider mite (*Tetranychus urticae* Koch).

The following data show the effectiveness of the new compound 2-methyl-2-(methylthio)propionaldioxime diethylphosphate against specifica invertebrate animal pests.

TABLE I

| Animal | Concentration, p.p.m. | Mortality (percentage) |
|---|---|---|
| Cotton boll weevil | 500 | 100 |
| Confused flour beetle | 500 | 70 |
| German cockroach | 500 | 100 |
| House cricket | 500 | 100 |
| Housefly | 500 | 100 |
| Mexican bean beetle | 500 | 100 |
| Two-spotted spider mite | 500 | 100 |
| Southern armyworm | 2,000 | 100 |

The tabulated almost 100% mortalities of the eight pests indicate that the compound can be used at concentrations less than 500 and 2000 p.p.m. to obtain practical control of these and other invertebrate animal pests. In accordance with the recognized variabilities in sensitivity and resistance of such invertebrate animal pests, the compounds of this invention can be used as pesticides at concentrations ranging from about 100 to about 6000 p.p.m.

Control is achieved by applying the compounds themselves, or the compounds formulated with a diluent carrier, to insects, mites, objects, or a situs. Advantageously, the diluent carrier can be a dispersible pesticide carrier. The carrier may or may not include an adjuvant or adjuvants. Suitable formulations in accordance with the invention are described hereinafter.

The new dilower-alkylphosphates of 2-(lower-alkylthio)alkanaldoximes are prepared by condensing a 2-(lower - alkylthio)alkanaldoxime with a dilower-alkyl ester of chlorophosphoric acid or a dilower-alkyl ester of chlorothiophosphoric acid. The condensation reaction is advantageously effected in a fluid medium containing an acid acceptor. The acid acceptor is used in order to remove hydrogen chloride from the reaction medium as the desired product is formed. Further advantageously, the fluid reaction mixture is heated in order to promote the reaction.

Various well-known, inert organic solvents are suitable for the fluid medium. Representative suitable ones are benzene, toluene, diethyl ether, ethyl propyl ether, hexane, octane, and chloroform. Suitable acid acceptors include trialkylamines, e.g. triethylamine (preferred), trimethylamine, and N,N-dimethylethylamine; N,N-dialkylanalines, e.g., N,N-dimethylaniline; pyridine and lutidine; and like tertiary amines.

The reaction proceeds at temperatures in the range of about 0° C. to about 130° C., a preferred temperature range being about 10° C. to about 85° C. Conveniently, the reaction mixture is heated at the reflux temperature in order to obtain optimal yields of product.

Stoichiometrically, the reaction requires one mole of 2-(lower-alkylthio)alkanaldoxime for each mole of dilower-alkyl ester of chlorophosphoric or chlorothiophosphoric acid. Hence, the reactants can be mixed in equimolar amounts. Advantageously, however, an excess of the chlorophosphate or chlorothiophosphate is used, at least a slight molar excess being preferred.

The dilower-alkylphosphate of 2-(lower-alkylthio)alkanaldoxime is recovered from the reaction mixture by conventional recovery methods, for example, filtration, solvent extraction, solvent evaporation, distillation, fractionation, and crystallization.

The 2-(lower-alkylthio)alkanaldoxime starting compounds are known or can be prepared by known methods as described in Canadian Patent No. 735,483 issued May 31, 1966, and British Patent No. 1,046,407 published October 26, 1966.

Some representative dilower-alkylphosphates of 2-(lower-alkylthio)alkanaldoximes are as follows:

2-(propylthio)propionaldoxime dimethylphosphate,
2-(isopropylthio)propionaldoxime diethylphosphate,
2-(butylthio)propionaldoxime diethylphosphate,
2-(tert-butylthio)propionaldoxime diethylphosphate,
2-(isobutylthio)propionaldoxime diethylphosphate,
2-(sec-butylthio)propionaldoxime diethylphosphate,
2-methyl-2-(propylthio)propionaldoxime diethylphosphate,
2-methyl-2-(butylthio)propionaldoxime diethylphosphate,
2-(methylthio)butyraldoxime diethylphosphate,
2-methyl-2-(ethylthio)valeraldoxime diethylphosphate,
2-ethyl-2-(methylthio)butyraldoxime diethylphosphate,
2-methyl-2-(methylsulfinyl)butyraldoxime diethylphosphate,
2-methyl-2-(methylsulfinyl)propionaldoxime diethylphosphate,
2-methyl-2-(methylsulfonyl)butyraldoxime diethylphosphate, and
2-methyl-2-(methylsulfonyl)propionaldoxime diethylphosphate.

Other compounds coresponding to the above and the general structural Formula I can be prepared according to the process of the invention.

The compounds of Formula I wherein X is $$-\overset{O}{\underset{}{S}}-$$

and $$-\overset{O}{\underset{\underset{O}{\|}}{\overset{\|}{S}}}-$$

are prepared from the corresponding sulfides of Formula I by oxidation with an oxidizing agent, for example, peracetic acid, perbenzoic acid, and the like.

Compounds according to Formula I wherein X is $$-\overset{O}{\underset{}{\overset{\|}{S}}}-$$

are conveniently prepared by using one molar equivalent of peracetic acid for one molar equivalent of the corresponding Formula I sulfide. Similarly, the corresponding compounds according to Formula I wherein X is $$-\overset{O}{\underset{\underset{O}{\|}}{\overset{\|}{S}}}-$$

are prepared by using at least two molar equivalents of an oxidizing agent.

The oxidation reaction is accomplished by adding an organic solution of peracetic acid (preferably about 10% to about 30% concentration) to an organic solution of the sulfide. Suitable organic solvents include ethyl acetate, acetone, methylene chloride, and the like. The peracetic acid solution is added slowly with stirring in order to avoid localized generation of undesirable high temperatures in the mixture. After allowing adequate time for completion of the reaction, the thus produced 2-(alkylsulfinyl or -sulfonyl)alkanaldoxime dialkylphosphate is recovered and purified by conventional techniques such as filtration, solvent extraction and evaporation, crystallization, and distillation.

The following examples are illustrative of the process and products of the present invention but are not to be construed as limiting.

EXAMPLE 1

Preparation of 2-methyl-2-(methylthio)propionaldoxime diethylphosphate

To a solution consisting of 6.66 g. (0.050 mole) 2-methyl-2-(methylthio)propionaldoxime, 50 ml. benzene, and 7.5 ml. (0.054 mole) triethylamine was added 8.63 g. (0.054 mole) diethyl chlorophosphate. The reaction solution was stirred for one hr. at about 25° C., and was then heated at the reflux temperature for three hrs. A suspension was obtained that was filtered to remove the triethylamine hydrochloride formed during the reaction. The filtrate was then concentrated by evaporating the solvent under reduced pressure. There was obtained an oil comprising 2-methyl-2-(methylthio)propionaldoxime diethylphosphate. Characterizing Infra-red absorption maxima are:

$$P=O \text{ at } 1280 \text{ cm.}^{-1}$$

and $$P-O \text{ at } 1035 \text{ cm.}^{-1}$$

Characterizing nuclear magnetic resonance absorptions in chloroform-d are:

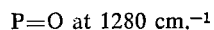
—O CH$_2$CH$_3$ at 4.20δ

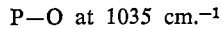
—S CH$_3$ at 1.90δ

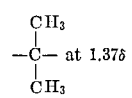

—O CH$_2$CH$_3$ at 1.32δ

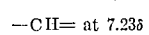
—CH= at 7.23δ

Following the same procedure, but substituting dimethyl chlorophosphate, diethyl chlorothiophosphate, and dibutyl chlorophosphate for diethyl chlorophosphate, there were prepared the corresponding 2-methyl-2-(methylthio)propionaldoxime dimethylphosphate, 2 - methyl - 2-(methylthio)propionaldoxime diethylthiophosphate, and 2-methyl-2-(methylthio)propionaldoxime dibutylphosphate.

EXAMPLE 2

Following the procedure of Example 1, but substituting 2-methyl-2-(ethylthio)propionaldoxime, 2-methyl-2-(isopropylthio)propionaldoxime, 2-methyl - 2 - (methylthio)butyraldoxime, and 2 - (ethylthio)propionaldoxime, there were prepared the corresponding 2-methyl-2-(ethylthio)propionaldoxime diethylphosphate, 2-methyl-2-(isopropylthio)propionaldoxime diethylphosphate, 2-methyl-2 - (methylthio)butyraldoxime diethylphosphate, and 2-(ethylthio)propionaldoxime diethylphosphate, respectively.

The new insecticidal and miticidal Formula I 2-(lower-alkylthio)alkanaldoxime dilower-alkylphosphates of this invention can be used as the pure compounds; but for practical reasons, the compounds are preferably formulated as pesticidal compositions. More particularly, the new 2-(lower-alkylthio)alkanaldoxime dilower-alkylphosphates are preferably formulated with a diluent carrier. Many different kinds of dispersible diluent carriers are commonly used in the art. Such carriers may or may not include adjuvants.

For example, pesticidal compositions useful against insects which infest plants can be formulated as granulars, dusts, wettable powders, emulsifiable concentrates, aqueous dispersions, solutions, and flowable creams for application to insects, mites, objects, or a situs. Moreover, the new 2-(lower-alkylthio)alkanaldoxime dilower-alkylphosphates of the invention can be the sole active agent in a composition, or other insecticidal, miticidal, fungicidal, virucidal, bactericidal, or synergistic components may be included.

The 2-(lower-alkylthio)alkanaldoxime dilower-alkylphosphates of this invention can be readily formulated as dusts by grinding a mixture of the compounds and a pulverulent carrier in the presence of each other. Grinding is conveniently accomplished in a ball mill, a hammer mill, or by air-blast micronization. A suitable ultimate particle size is less than 60 microns. Preferably, 95% of the particles are less than 50 microns, and about 75% are 5 to 20 microns. Dusts of that degree of comminution are conveniently free-flowing and can be applied to inanimate matter, fruit trees, crop plants, and soil so as to effect thorough distribution and coverage. Dusts are particularly adapted for effectively controlling insects and mites over wide areas when applied by airplane. They are also indicated for application to the undersides of plant foliage.

Representative suitable pulverulent carriers include the natural clays such as China, Georgia, Barden, attapulgus, kaolin, and bentonite clays; minerals in their natural forms as they are obtained from the earth such as talc, pyrophyllite, quartz, diatomaceous earth, fuller's earth, chalk, rock phosphates and sulfates, calcium carbonates, sulfur, silica and silicates; chemically modified minerals such as washed bentonite, precipitated calcium phosphate, precipitated calcium carbonate, precipitated calcium silicate, synthetic magnesium silicate, and colloidal silica; and organic flours such as wood, walnut shell, soybean, cottonseed, and tobacco flours, and free-flowing, hydrophobic starches.

Dusts can also be prepared by dissolving a Formula I 2-(lower-alkylthio)alkanaldoxime dilower-alkylphosphate in a volatile solvent such as methylene chloride, mixing the solution with a pulverulent carrier and evaporating the solvent.

The proportions of pulverulent carrier and 2-(lower-alkylthio)alkanaldoxime dilower-alkylphosphate vary over a wide range depending upon the pests to be controlled and the conditions of treatment. In general, dust formulations can contain up to about 50% (on a weight basis) of the active ingredient. Dusts having as little as 0.001% of the active ingredient can be used, but a generally preferred proportion is from about 0.50% to about 20% of active ingredient.

The dispersible powder formulations of this invention are prepared by incorporating a surfactant in a dust composition prepared as described above. When about 0.1% to about 12% of a surfactant is incorporated in a dust, the dispersible powder thus obtained is particularly adapted for further admixture with water for spraying on inanimate matter and products, fruit trees, field crops, and soil. The dispersible powders can be admixed with water to obtain any desired concentration of active ingredient, and the mixture can be applied in amounts sufficient to obtain predetermined rates of application and uniform distribution. With this flexibility in mind, the dispersible powders of the invention can conveniently comprise preferably about 10% to about 50% of active ingredient.

Representative surfactants useful for preparing dispersible powder formulations of this invention include alkyl sulfates and sulfonates, alkyl aryl sulfonates, sulfosuccinate esters, polyoxyethylene sulfates, polyoxyethylenesorbitan monolaurate, alkyl aryl polyether sulfates, alkyl aryl polyether alcohols, alkyl naphthalene sulfonates, alkyl quaternary ammonium salts, sulfated fatty acids and esters, sulfated fatty acid amides, glycerol mannitan laurate, polyalkylether condensates of fatty acids, lignin sulfonates, and the like. The preferred class of surfactants includes blends of sulfonated oils and polyalcohol carboxylic acid esters (Emcol H–77), blends of polyoxyethylene ethers and oil-soluble sulfonates (Emcol H–400), blends of alkyl aryl sulfonates and alkylphenoxy polyethoxy ethanols (Tritons X–151, X–161, and X–171), e.g. about equal parts of sodium dodecylbenzene sulfonate and isooctylphenoxy polyethoxy ethanol containing about 12 ethoxy groups, and blends of calcium alkyl aryl sulfonates and polyethoxylated vegetable oils (Agrimul $N_4S$). It will be understood, of course, that the sulfate and sulfonate surfactants suggested above will preferably be used in the form of their soluble salts, for example, their sodium salts. All of these surfactants are capable of reducing the surface tension of water to less than about 40 dynes per centimeter in concentrations of about 1% or less. The dispersible powder compositions can be formulated with a mixture of surfactants of the types indicated if desired.

A suitable dispersible powder formulation is obtained by blending and milling 327 lbs. of Georgia Clay, 4.5 lbs. of isooctylphenoxy polyethoxy ethanol (Triton X–100) as a wetting agent, 9 lbs. of a polymerized sodium salt of substituted benzoid long-chain sulfonic acid (Daxad 27) as a dispersing agent, and 113 lbs. of the active ingredient. The resulting formulation has the following percentage composition (parts herein are by weight unless otherwise specified).

| | Percent |
|---|---|
| Active ingredient | 25 |
| Isooctylphenoxy polyethoxy ethanol | 1 |
| Polymerized sodium salt of substituted benzoid long-chain sulfonic acid | 2 |
| Georgia clay | 72 |

This formulation, when dispersed in water at the rate of 10 lbs. per 100 gals., gives a spray formulation containing about 0.3% (3000 p.p.m.) active ingredient which can be applied to pests, plants or other pest habitats, or pest foods to control pests.

If desired, dispersants such as methyl cellulose, polyvinyl alcohol, sodium ligninsulfonates, and the like can be included in the dispersible powder formulations of this invention. Adhesive or sticking agents such as vegetable oils, naturally occurring gums, casein, and others can also be included. Corrosion inhibitors such as epichlorohydrin and anti-foaming agents such as stearic acid can also be included.

The compounds of this invention can be applied to insects, mites, objects, or a situs in aqueous sprays without a solid carrier. Such aqueous sprays are advantageous for certain types of spray equipment and conditions of application. They are also advantageous when uniform dispersions, homogeneous solutions, or other easily mixed aqueous sprays are desired.

Aqueous sprays without a solid carrier are prepared from concentrated solutions of the compounds of the invention in an inert organic solvent carrier. The inert organic solvent carrier may be one that is miscible or immiscible with water. The compounds that are somewhat soluble in water can be dissolved in a water miscible solvent carrier, e.g., ethanol and mixed with water to give homogeneous solutions. The compounds that are less soluble in water can be dissolved in a solvent carrier that is immiscible with water and the solution dispersed in water to give a uniform dispersion, e.g., an emulsion.

In an oil-in-water emulsion, the solvent phase is dispersed in the water phase and the dispersed phase contains the active ingredient. In this way, uniform distribution of a water insoluble active ingredient is achieved in an aqueous spray. A solvent carrier in which 2-(lower-alkylthio)alkanaldoxime dilower-alkylphosphates are highly soluble is desirable so that relatively high concentrations of active ingredient can be obtained. Sometimes, one or more solvent carriers with or without a cosolvent can be used in order to obtain concentrated solutions of the active ingredient, the main consideration being to employ a water-immiscible solvent for the active ingredient that will hold the compound in solution over the range of concentrations useful for applying to insects, mites, objects, or a situs.

The emulsifiable concentrates of the invention are prepared, therefore, by dissolving the active ingredient and a surfactant in a substantially water-immiscible solvent carrier (i.e., a solvent carrier which is soluble in water to the extent of less than 2.5% by volume at temperatures of the order of 20° to 30° C.), for example, cyclohexanone, methyl propyl ketone, summer oils (a paraffinic, intermediate distillation fraction having a viscosity range from 40 to 85 seconds Saybolt and an unsulfonatable residue over 90 percent), ethylene dichloride, aromatic hydrocarbons such as benzene, toluene, and xylene, and high-boiling petroleum hydrocarbons such as kerosene, diesel oil, and the like. If desired, a cosolvent such as methyl ethyl ketone, acetone, isopropanol, and the like can be included with the solvent carrier in order to enhance the solubility of the active ingredient. Aqueous emulsions are then prepared by mixing with water to give any desired concentration of active ingredient. The surfactants which can be employed in the aqueous emulsions of the invention are those types noted above. Mixtures of surfactants can be employed, if desired.

Advantageously, the concentration of active ingredient in the emulsifiable concentrates can range from about 5% to about 50% by weight, preferably from about 10% to about 40%. A concentrate comprising 20% (by weight) of the compound dissolved in a water-immiscible solvent of the kind noted above can be admixed with an aqueous medium in the proportions of 13 ml. of concentrate with 1 gal. of medium to give a mixture containing 700 parts of active ingredient per million parts of liquid carrier. Similarly, 1 qt. of a 20% concentrate mixed with 40 gals. of water provides about 1200 p.p.m. (parts per million) of active ingredient. In the same manner, more concentrated solutions of active ingredient can be prepared.

The concentrate compositions of the invention which are intended for use in the form of aqueous dispersions or emulsions can also comprise a humectant, that is to say, an agent which will delay the drying of the composition in contact with material to which it has been applied. Suitable humectants include glycerol, diethylene glycol, solubilized lignins, such as calcium ligninsulfonate, and the like.

The granular compositions of this invention are convenient for application to soil when persistence is desered. Granulars are readily applied broadcast or by localized, e.g., in-the-row applications. The individual granules may be any desired size from 30 to 60 mesh up to 20 to 40 mesh, or even larger. Granulars are prepared by dissolving the active compound in a solvent such as methylene chloride, xylene, or acetone and applying the solution to a quantity of a granulated absorbent carrier. Representative granulated absorbent carriers include ground corn cobs, gound walnut shells, ground peanut hulls, and the like. If desired, the impregnated granulated absorbent carrier can be coated with a coating that will preserve the integrity of the granular until it is applied to an object or situs favorable for release of the active ingredient.

The rates of application to insects, mites, objects, or situs will depend upon the species of pests to be controlled, the presence or absence of desirable living organisms, temperature conditions of treatment, and method and efficiency of application. In general, pesticidal activity is obtained when the compounds are applied at concentrations of about 100 to about 6000 p.p.m., preferably at concentrations of about 500 to about 4000 p.p.m.

The compositions containing 2-(lower-alkylthio)alkanaldoxime dilower-alkylphosphate according to the invention, can be applied to insects, mites, objects or situs by conventional methods. For example, an area of soil, a building, or plants can be treated by spraying wettable powder suspensions, emulsions, or solutions from power sprayers or from hand-operated knapsack sprayers. Dusts can be applied by power dusters, or by hand-operated dusters. Creams and ointment formulations can be applied to objects for prolonged protection from insects and mites.

It will of course be appreciated that the conditions encountered when applying the method and compositions of this invention to actual practice can vary widely. Included among the variables that may be encountered are the degree of infestation by pests, the particular pest to be controlled, the particular situs being treated, the age or degree of development of plants to be protected, the prevailing weather conditions, such as temperature, relative humidity, rainfall, dews, and so forth.

The novel compounds described herein are versatile pesticidal agents which can be employed for many purposes, e.g., in agriculture, in industry, etc.

I claim:

1. 2-(lower-alkylthio)alkanaldoxime dilower-alkylphosphates of the formula

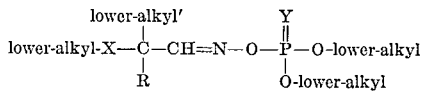

wherein X is a sulfur group selected from the group consisting of S—,

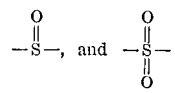

Y is oxygen or sulfur; R is hydrogen or lower-alkyl of from 1 to 3 carbon atoms, inclusive; lower-alkyl is of from 1 to 4 carbon atoms, inclusive; and the total number of carbon atoms comprising R and lower-alkyl is not more than 8.

2. The compound according to claim 1 wherein X is —S— and Y is oxygen.

3. 2 - (lower - alkylthio)propionaldoxime dilower-alkylphosphate according to claim 2.

4. 2-methyl - 2 - (methylthio)propionaldoxime dilower-alkylphosphate according to claim 3.

5. 2-methyl - 2 - (methylthio)propionaldoxime diethylphosphate according to claim 4.

References Cited

UNITED STATES PATENTS 2,816,128  12/1957  Allen _____ 260—944

FOREIGN PATENTS 1,052,981  3/1959  Germany _____ 260—944

CHARLES B. PARKER, Primary Examiner

R. L. RAYMOND, Assistant Examiner

U.S. Cl. X.R.

260—566; 424—211